United States Patent [19]
Gundlach et al.

[11] Patent Number: 6,099,891
[45] Date of Patent: Aug. 8, 2000

[54] LOW FAT MEAT PRODUCT

[75] Inventors: Larry C. Gundlach; Andrew L. Milkowski; Paul G. Morin, all of Madison; Gerald R. Popenhagen, Middleton, all of Wis.

[73] Assignee: Kraft Foods, Inc., Northfield, Ill.

[21] Appl. No.: 09/066,104

[22] Filed: Apr. 24, 1998

Related U.S. Application Data

[60] Division of application No. 08/694,146, Aug. 8, 1996, Pat. No. 5,762,993, which is a continuation-in-part of application No. 08/600,664, Feb. 13, 1996, Pat. No. 5,688,549, and application No. 08/570,831, Dec. 12, 1995, abandoned, which is a continuation of application No. 08/299,228, Aug. 31, 1994, abandoned, which is a division of application No. 08/130,347, Oct. 1, 1993, Pat. No. 5,382,444, which is a continuation of application No. 07/838,121, Feb. 19, 1992, abandoned.

[51] Int. Cl.⁷ ..................................................... A23L 1/317
[52] U.S. Cl. .................................................................. 426/646
[58] Field of Search .................................... 426/646, 641, 426/417

[56] References Cited

U.S. PATENT DOCUMENTS

| | | |
|---|---|---|
| 3,029,150 | 4/1962 | Bickel . |
| 3,032,421 | 5/1962 | Buchholz . |
| 3,447,932 | 6/1969 | Olson et al. . |
| 3,557,008 | 1/1971 | Jennings . |
| 4,210,677 | 7/1980 | Huffman ................................ 426/272 |
| 4,258,068 | 3/1981 | Huffman ................................ 426/272 |
| 4,377,597 | 3/1983 | Shapiro et al. ............................ 426/92 |
| 4,389,423 | 6/1983 | Madsen ................................ 426/417 |
| 4,423,083 | 12/1983 | Shenouda ................................ 426/574 |
| 4,680,183 | 7/1987 | Van Schouwenburg ............ 426/646 X |
| 4,778,682 | 10/1988 | Chapman ................................ 426/248 |
| 4,780,327 | 10/1988 | Gardner-Carimi ...................... 426/281 |
| 4,788,070 | 11/1988 | Brotsky et al. ......................... 426/264 |
| 4,948,621 | 8/1990 | Schwartz ................................ 426/652 |
| 5,011,703 | 4/1991 | Chapman ................................ 426/646 |
| 5,026,565 | 6/1991 | McLachlan et al. ..................... 426/241 |
| 5,073,394 | 12/1991 | Dake et al. ............................. 426/509 |
| 5,162,506 | 11/1992 | Hadden ................................ 530/412 |
| 5,167,977 | 12/1992 | Gamay ................................ 426/417 |
| 5,211,980 | 5/1993 | Cox ........................................ 426/601 |
| 5,382,444 | 1/1995 | Roehrig et al. ......................... 426/646 |
| 5,384,149 | 1/1995 | Lin ......................................... 426/646 |
| 5,387,424 | 2/1995 | Mendenhall ............................ 426/272 |
| 5,472,725 | 12/1995 | Mendenhall ............................ 426/521 |

*Primary Examiner*—Arthur L. Corbin
*Attorney, Agent, or Firm*—Cook, Alex, McFarron, Manzo, Cummings & Mehler, Ltd.

[57] ABSTRACT

Sources of neat having a high fat content, such as pork trimmings, are processed in a manner by which meat products prepared therefrom have a dramatically reduced fat content while retaining the desirable functionality of the unprocessed meat sources. The fat-containing meat trimmings or the like are comminuted, phosphated, heated and centrifuged under specific processing conditions in order to provide unformulated raw low-fat or no-fat meat having a fat content of not greater than about 1.5 percent by weight while having excellent functionality.

7 Claims, 2 Drawing Sheets

LOW FAT MEAT PRODUCT

This application is a divisional of application Ser. No. 08/694,146, filed Aug. 8, 1996, now U.S. Pat. No. 5,762,993, which is a continuation-in-part of application Ser. No. 08/600,664, filed Feb. 13, 1996, now U.S. Pat. No. 5,688,549 and of Ser. No. 08/570,831, filed Dec. 12, 1995, now abandoned, which is a continuation of Ser. No. 08/299,228, filed Aug. 31, 1994, now abandoned, which is a divisional of application Ser. No. 08/130,347, filed Oct. 1, 1993, U.S. Pat. No. 5,382,444, which is a continuation of Ser. No. 07/838,121, filed Feb. 19, 1992, now abandoned.

BACKGROUND OF THE INVENTION

The present invention generally relates to processing of raw meat into a very low-fat meat having excellent functionality, as well as to meat products of the fat-free variety. More particularly, the present invention transforms high-fat raw meat materials into a low-fat or so-called no-fat meat product which is highly functional, being suitable for use as a finished product and which has the ability to be molded, extruded and/or stuffed into a shape to provide finished food products which can be cooked, cured or otherwise processed as desired.

The level of fat included in diets is of concern in many channels, particularly with respect to meat products or foods which contain animal-originating meat components. Meat food products are available which fall into the generally low-fat category. In the past, it has been considered to be satisfactory if the fat content of an uncooked raw meat supply is within a general magnitude on the order of about 10 weight percent or even 5 weight percent. While fat percentages of this general magnitude for raw meat materials represent a substantial step toward reducing the intake of fat for those who consume products made from this reduced-fat raw material, it would be beneficial to provide a highly functional fat-reduced meat raw material having a much lower fat content.

Awareness of fat intake has led consumers to value highly those food sources which are relatively low in fat or have virtually no fat content. Traditionally, many meat products have been perceived by certain groups as being products that are relatively high in fat content. Various techniques have made available meat products having fat percentages of 5% or less, such as at the 1% to 4% by weight level of fat in the meat product. Examples are turkey breast products which can achieve fat levels at the lower values of these ranges.

Consumer perception has developed along these lines to the extent that there is a desire to have even these relatively low fat percentages reduced further, ideally to arrive at a fat-free condition or a nominally fat-free condition. For example, current guidelines which are followed by the USDA permit many packaged meat products to be labeled as "fat-free" provided the amount of fat in the packaged slice meat or sausage product is less than 0.5 gram of fat per 55 grams, which is less than 0.91% by weight of the total packaged meat product. Such a product is thus properly designated as "free" of fat, and nutritional labelling properly specifies a zero ("0") as the reported fat content. Accordingly, there is an important need for meat products having a fat content which meets these zero, or nominal zero levels.

At times, raw meat materials having lowered fat contents are made available by procedures which include specially trimming raw meat cuts. These lower fat meat materials are relatively expensive and often are not readily available in volumes which would be suitable for extended use in mass-produced foods. In addition, such products can be highly labor-intensive. Certain fat-free meat products which meet governmental guidelines as discussed above have been commercialized on a production-scale basis. Typically, these are fat-free turkey and chicken whole muscle (often breast) products. Other fat-free products have been formulated from traditionally higher fat content sources. Such products can include reformulation in order to reduce fat levels by the inclusion of non-meat components which generally dilute the fat present in the meat which is included within the batter, grind or emulsion from which such a product is formed. It is often the case that these types of fat-free products, when subjected to taste tests, score significantly lower than corresponding products which are not of the fat-free variety.

Certain approaches in the past have been proposed for processing a high-fat meat supply into one that is of reduced fat content. Often, these types of procedures include cooking, grinding and centrifuging as a basic approach for separating a fat-rich phase from another phase having a lower fat content. The phase having a lower fat content typically contains lean fractions which had become denatured during processing, and the functionality of this phase often is reduced substantially, rendering it unsuitable and/or undesirable for use in many applications. Also, approaches such as these often do not provide a functional, reduced fat meat having a fat percentage on the order of the low-fat or no-fat products which are the subject of the present invention.

The present invention addresses the need for reduced fat meat which has an exceptionally low fat content so as to qualify as having a zero reported fat content, even including pork, while at the same time not being denatured to any significant extent in order to thereby provide a highly functional meat product which is exceptionally low in fat content. It is especially desirable that a fat-reduced raw meat material be provided which makes possible the preparation of finished meat products or meat-containing products such as patties, sausages, wieners, luncheon meats and formed meat products. Substantial progress along these lines has been made by approaches such as that of U.S. Pat. No. 5,382,444, incorporated hereinto by reference. By following this approach, it has been possible to provide valuable undenatured and very low-fat meat products. However, when it comes to certain meat sources, such as pork, it has not been possible heretofore to consistently achieve a fat content for meats such as pork which is low enough to meet the objectives of the present invention.

SUMMARY OF THE INVENTION

The present invention is one of meat fat removal enhancement. A low-fat or no-fat meat raw material is prepared from meat supplies having a substantial fat content, which is typically in excess of 20 weight percent, based upon the total weight of the meat supply which also includes protein and moisture. This raw meat material is processed so as to provide the reduced fat meat raw material which has a fat content equal to or less than about 1.5% fat, even for pork from which it is especially difficult to remove bound fat below the 1.5 weight percent level. Furthermore, this enhanced fat-reduced meat retains the functionality of the raw material meat supply. In the preferred process, a phosphate source is incorporated into comminuted raw meat trimmings, and they are heated to a temperature and under conditions at which fat present in the raw trimmings will liquify and its viscosity will be minimized, but protein denaturation will be substantially completely avoided. The heated comminute and phosphate mixture is passed through a suitable centrifuge to separate all but a very minor portion of the fat content of the meat trimmings from an enhanced fat-reduced raw meat product having excellent functionality.

It is accordingly a general object of the present invention to provide an especially reduced fat meat from meat trimmings having a much higher fat content.

Another object of the present invention is to provide an improved exceptionally fat-reduced meat having superior functionality which is substantially the same as that of raw lean meat and is suitable for use as an unformulated low-fat or no-fat raw meat material.

Another object of this invention is to provide low-fat or no-fat meat products such as pork, beef, turkey, chicken and mutton by incorporating the use of phosphates for conditioning the supply of meat trimmings for effecting removal of fat that would otherwise remain bound with the meat except for the inclusion of the phosphate source.

Another object of the present invention is to provide low-fat or no-fat meat raw materials on a continuous basis and by mechanized approaches which do not require hand trimming of fat from off of the raw material, which can itself be a high-fat product of meat trimming operations.

Another object of this invention is to utilize high-fat raw materials to make undenatured no-fat or low-fat meat for use as finished products.

Another object of the present invention is to provide finished meat products, including pork products, which have the taste and texture of finished products prepared from traditional raw ground meat.

Another object of this invention is to provide a low-fat or no-fat meat having a ratio of water-holding capacity to protein percentage, or functionality as described herein, which is equal to or greater than 3, and preferably equal to or greater than 4.

Another object of the present invention is to provide an improved meat product that has a fat content which is at or below regulatory definition(s) of fat-free meat products which are typically below one weight percent fat based on the total weight of the meat product.

Another object of the present invention is to provide an improved fat-free pork product, including ham and the like, which has a nominal fat content of zero.

Another objective is to achieve meat products which are of the fat-free variety such as so-called fatfree meat products having a fat percent by weight which is equal to or less than that allowed by controlling governmental regulations including the United States Nutritional Labeling and Education Act (NLEA) regulations requiring that for a non-entree meat to be labeled as "fat-free", it must have less than 0.5 gram of fat per serving and reference amount, which is 55 grams for a sliced meat.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PREFERRED EMBODIMENTS

The fat-containing raw materials which are transformed into the low-fat or no-fat raw meat in accordance with the present invention typically are trimmings from meat processing operations. These trimmings, typically collected by cutting away visible fat from the muscle, are high in fat content. Examples of these trimmings, which are generally available in high volumes and at relatively low cost, include 72 pork (containing roughly 28% fat and 72% "lean", which is the portion of the 72 pork which is not fat, typically lean muscle which includes moisture). Other trimmings in this regard are 42 pork (approximately 58% fat and 42% lean), 50 beef (approximately 50% fat and 50% lean), mechanically deboned turkey (often between about 20% and 30% fat), and other sources of red meat, white meat or fowl. Generally speaking, these raw material meat sources or trimmings have a fat percent generally on the order of about 20 to about 60 weight percent. Some or all of these types of materials can be provided in ground form, a typical supply being ground to a particle size approximating one-eighth inch. Raw materials of this type are usually at a temperature on the order of 40° F.

Figure 1:
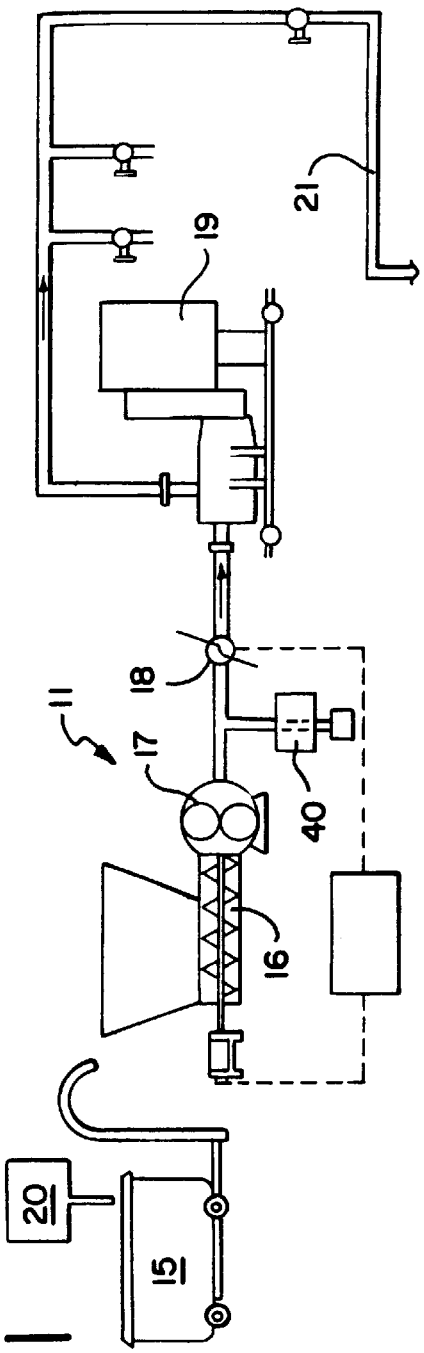
FIG. 1 is a generally schematic view of a particle size reduction arrangement whereby meat trimmings which are not in a comminuted state are reduced in particle size by being comminuted.
Figure 2:
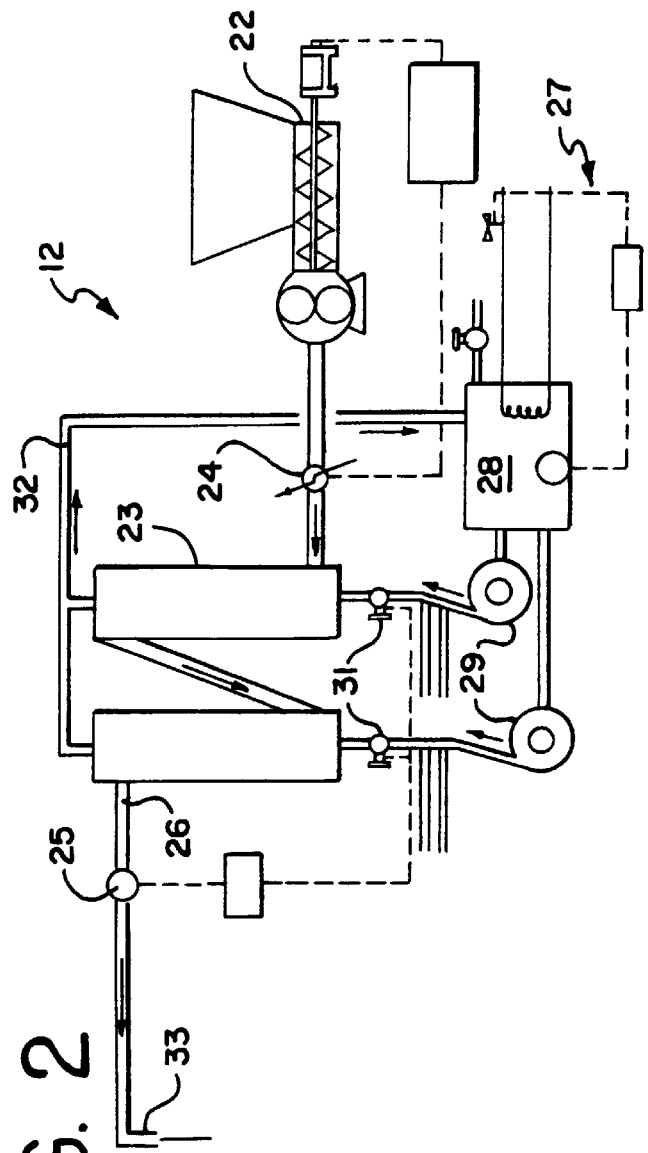
FIG. 2 is a generally schematic view of an arrangement for continuously, rapidly and evenly modifying the temperature of the comminuted meat.
Figure 3:
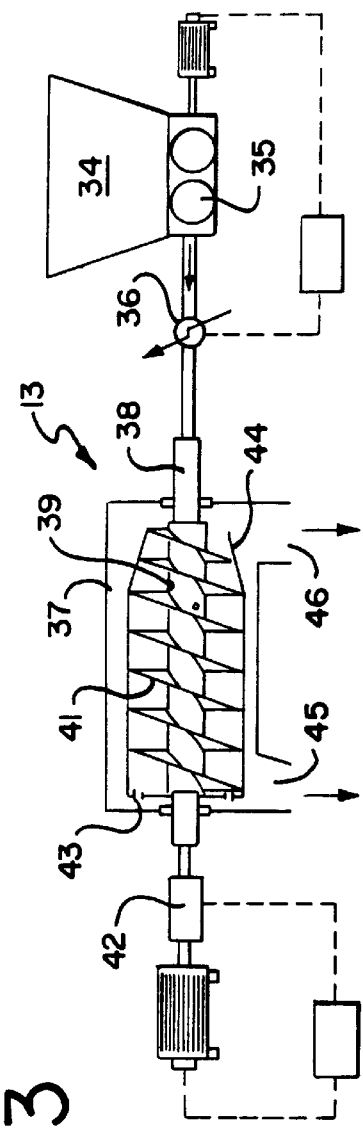
FIG. 3 is a generally schematic view illustrating passage of the warm, comminuted meat supply through a continuous decanter centrifuge.
Figure 4:
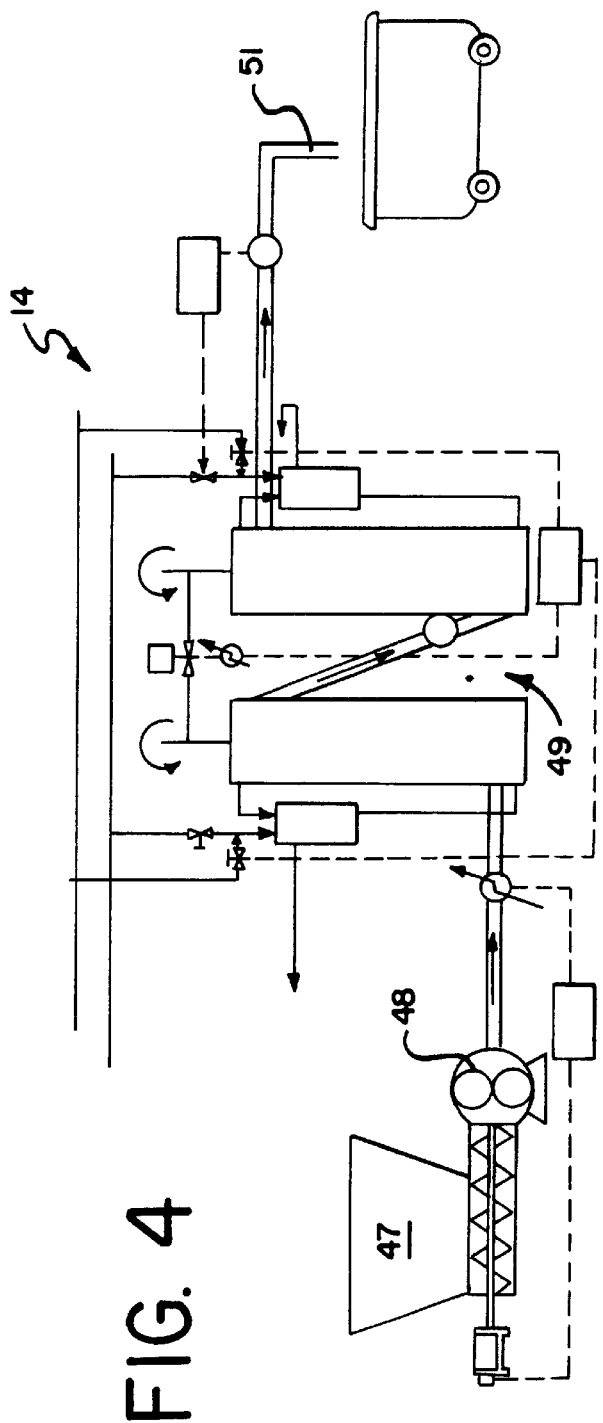
FIG. 4 is a generally schematic view illustrating an arrangement suitable for chilling the reduced fat meat flowing out of the continuous decanter centrifuge shown in FIG. 3.

The preferred apparatus illustrated in the drawings includes a particle size reduction station, generally designated as 11 in FIG. 1, a temperature adjustment station, generally designated as 12 in FIG. 2, a centrifugation station, generally designated as 13 in FIG. 3, and a chilling station, generally designated as 14 in FIG. 4. Although not shown in the drawings, it will be appreciated that these various stations are in communication with each other whereby meat material processed at an upstream station is passed to a receiving area of the next downstream station, as will be discussed in greater detail hereinafter.

Particle size reduction station 11 reduces the grind size of the fat-containing raw meat material to comminuted particle sizes. Generally, coarsely ground raw meat is supplied into a dumper 15 for passage into a transporting mechanism such as a pump feeder 16 of generally known construction including members such as a positive displacement pump 17 and a flow meter 18. Meat is thereby fed into a comminution unit 19 in order to reduce the particle size of the ground meat to form a flow of comminuted meat. It will be appreciated that some fat-containing raw materials such as mechanically deboned turkey are provided in a generally comminuted state, and the particle size reduction station 11 could be omitted in this instance.

A preferred comminution unit 19 is a Cozzini grinding device or emulsion mill wherein a plate having three protruding knives spins tightly against a plate having 4.5 mm holes therewithin. A rotating vane member pumps the comminuted meat through and out of the comminution unit and into a transfer conduit 21. These types of devices are high-speed grinders, and the bladed plate is pressure fit against a foraminous plate. The meat raw material is fed through a pipe into the emulsion mill housing and engages the rotating blades to be severed to a size which passes through the holes in the plate. Conduits in addition to transfer conduits 21 such as the two which are partially shown in FIG. 1 can also be provided whereby a single particle reduction station 11 can supply a flow of comminuted meat to more than one temperature adjustment station 12.

In one embodiment with respect to the addition of phosphate into the system in accordance with the invention, an upstream injector 20 can be provided as shown in FIG. 1. This upstream injector deposits a phosphate source into the raw trimmings. As an example, this upstream injector 20 can open into the dumper 15 or into any other suitable container at or upstream of the pump feeder 16. Generally, this upstream location is preferred when the phosphate source is a complex one which might require some time in order to break down into a mono-type of phosphate. When the powdered buffering salt or phosphate is added in a so-called polymeric state, for example sodium tripolyphosphate, adequate time must be available during the continuous process in accordance with the invention in order to release diphosphate forms for achieving the result in accordance with the invention by the time that the flow of meat enters the downstream centrifuge, as discussed in more detail hereinafter.

Another embodiment concerning the phosphate addition incorporates a dry solids injector 40 positioned upstream of the temperature adjustment station 12 and of the centrifuge assembly. Injector 40 forces the particulate or powdered buffering salt or phosphate into the meat flow. The injection is such that the phosphate enters into the continuously flowing meat stream in a manner than fosters blending into and with the meat flow. With this embodiment, it is preferred that the phosphate groups not be tied up in chemical complexes when this embodiment is practiced. In this regard, a diphosphate or the like is typically preferred when the fat removal enhancing phosphate is inserted by means of the downstream dry solids injector 40.

With more particular reference to the comminution which is typically carried out at the particle size reduction station 11, the objective is to provide a very finely ground raw meat, although the grind is not to be excessively fine. Often, one can detect meat fibers in the comminuted material. Near emulsion grinds are accomplished. The grind is to be fine enough so that many cells of fat are broken, while avoiding the breakage of so many fat cells that a true emulsion is formed and the protein material again wraps around fat particles so as to interfere with separation of protein from fat. Typically, the particle size will be less than about 2 mm, preferably less than or equal to about 1 mm. In an especially preferred situation, the meat particles or muscle fiber pieces are approximately 0.1 to 0.6 mm in length and approximately 0.06 to 0.1 mm in diameter.

Excessive comminuting can be indicated by too great of a rise in the temperature of the raw meat when it passes through the particle reduction station 11. For example, if the comminuting unit is operating under conditions such a grinder speed which is too harsh for the flow rate through the comminuting unit, the particle size can be made too small and/or the temperature rise can be too great. It is believed that the detrimental result thereof is that the lean and fat begin to separate too early in the process, thereby making more difficult separation at subsequent stations. Also, excessive comminuting can be accompanied by some evidence of denaturing of protein.

As stated, raw fat-containing material passing through the particle size reduction station 11 will be raised in temperature as a result of the grinding operation. Typically, the temperature rise will need to be adjusted at the temperature adjustment station 12. A feeder pump apparatus 22 directs the supply of comminuted meat to a heat exchanger assembly 23.

Preferably, the heat exchanger assembly raises the temperature of the flow of comminuted meat so that the temperature of substantially the entire flow of meat therethrough is high enough to release the fat in accordance with the approach discussed herein and is typically not greater than about 115° F. or slightly thereabove. It is important that the temperature be closely controlled and that this temperature be controlled for all of the meat passing through the temperature adjustment station 12. Preferably, the temperature adjustment station 12 should maintain the desired temperature to such an extent that it is possible to maintain a target temperature ±1.5° F. for virtually all of the comminuted meat flowing through the heat exchanger assembly 23. Generally, the processing residence time within heat exchanger assembly 23 will be for less than ten minutes, preferably less than five minutes. Inclusion of one or more swept or scraped surface heat exchangers or wiped-film heat exchangers are preferred for achieving this objective.

Temperature adjustment station 12 preferably also includes a flow meter 24 and a temperature sensor 25, as well as a recirculation conduit (not shown) and an outflow conduit 26. For example, in the event that the sensor determines the temperature of the meat exiting the heat exchanger assembly 23 is not within the designated tolerances, the meat flow will be recirculated and passed again through the heat assembly 23. The heat exchanger assembly can include a water jacketing arrangement which includes a steam supply unit, generally designated as 27, a water reservoir 28, centrifugal pumps 29, flow control valves 31 and recirculation, channels 32.

Heated comminuted meat flows out of an exit conduit 33 of the temperature adjustment station. At this stage, the comminuted meat temperature of all of the meat flowing through the exit conduit 33 will be lower than 120° F., preferably not greater than about 115° F. It has been found that, with most comminuted meat, if the temperature is raised to 120° F. for any significant length of time, a substantial quantity of the protein therein becomes denatured and loses its natural raw functionality. Similarly, the denaturation process typically is initiated at temperatures equal to or greater than about 115° F. if the comminuted meat is subjected to temperature much above this range for a short a time period as 5 seconds. Temperatures as low as about 90° F. or below can be adequate for some meats when longer time periods are practiced. A preferred lower limit is about 90° F., a more preferred lower limit being about 100° F. It will be appreciated that the exact temperature will vary with the meat source and also with the residence time. The temperature must be high enough, for the particular meat source and under the particular time and flow conditions, so that optimum separation can be achieved during the subsequent steps. By closely controlling the optimum temperature for the particular meat and system, protein and fat overheating is avoided while providing the needed feed temperature into the centrifugation system 13.

Centrifugation system 13 receives the heated flow of comminuted meat. Preferably, the exit conduit 33 joins with a receiver 34 having a positive displacement pump 35 and a flow meter 36 into a continuous decanter centrifuge assembly 37.

Referring to the operation of the decanter centrifuge assembly, same decants a fat portion off of a protein portion by relative rotation so as to impart gravitational forces on the heated, comminuted and phosphated meat to accomplish the enhanced decanting function. This meat flow enters tube 38 and is flung therefrom through a plurality of exit holes 39 and to an auger assembly 41. Revolutions per minute of the continuous decanter centrifuge 37 are measured by a tachometer 42, and the G-force is calculated from the revolutions per minute readings. The fat component has a liquid consistency, and it exits the continuous decanter centrifuge 37 through openings 43. An angled dam 44 is provided at an opposite end of the centrifuge 37, and the auger assembly 41 augers the generally solid meat or protein component toward and along the angled dam 44 and out of the centrifuge 37. The substantially liquid fat component cannot be augered up to the angled dam 44 and thus exits through the openings 43. Accordingly, the liquid fat component flows through outlet 45, while the meat or protein component flows through outlet 46. The material flowing through the outlet 45 is a fat by-product which may be further processed or discarded as desired. Flow through the outlet 46 provides the low-fat or no-fat meat product prepared in accordance with the invention.

Typically, the temperature of the low-fat or no-fat meat flowing from the outlet 46 will be lowered promptly for reasons well known in the art in order to avoid any risk of developing microbiologically undesirable conditions in the meat or of denaturing the meat protein. A suitable means for achieving the necessary cooling is the chilling station 14 illustrated in FIG. 4. A suitable receiver 47 and positive displacement pump 48 transport the flow of meat from the outlet 46 into a cooling heat exchanger assembly 49, which is preferably a scraped-surface heat exchanger system as described herein in connection with the temperature adjustment station 12, except instead of using heated water, the cooling heat exchange assembly 49 uses liquid ammonia or the like. The reduced fat meat flowing from outlet conduit 51 has a temperature of about 40° F. or less. It is important to note that, with the present process and apparatus, the low-fat or no-fat meat product is not frozen, thereby avoiding a procedure which can damage meat fibers. Usually, the time during which the product is within the cooling assembly 49 will be not greater than about 10 minutes.

With further reference to the chilling station 14, this station could be eliminated in those instances where the low-fat or no-fat meat is directly fed into a meat manufacturing operation. For example, the still warm low-fat or no-fat meat could be fed directly to a wiener-making line for combining with other ingredients and shaping into wieners or the like. This is possible, of course, only if processing conditions are such that there are no microbiological concerns or similar risks.

In addition to being able to provide low-fat or no-fat meats having exceptionally low fat contents, the present apparatus and process provide same with a functionality that is virtually indistinguishable from that of unprocessed raw meat. The functionality is such that the reduced-fat meat is readily combined with customary food components. Generally speaking, functionality is calculated by dividing the gross water holding capacity by the percentage of protein in the reduced-fat meat. It is generally believed that the present invention increases the gross water holding capacity of the meat processed according to the invention. This enhanced gross water holding capacity is believed to be an important indicator of the excellent functionality of the low-fat or no-fat meat. The present invention allows reduction of the fat percentage of high-fat trimmings, including pork, to at or below about 1.5 weight percent while maintaining the following functionality parameters: a protein level of greater than 20%, a functionality in excess of 3, and a hydroxyproline value below about 11 mg/g, preferably less than 6 mg/g.

With more particular reference to the water holding capacity, excess or gross water binding is a measure of the extra swelling capacity for meat prior to cooking and is thereby a measure of the quantity and/or quality of functional protein. This gross water holding capacity is calculated by a procedure whereby the percent cook-out is determined and is used as a measure of meat quality with respect to cooking when proteins are maximally hydrated. Regarding the hydroxyproline analysis of meat, this is an amino acid found in collagenous protein, but not in contractile protein. Thus, by quantitatively determining the hydroxyproline levels in meat products, the collagen content of the sample is measured.

With further reference to the fat-containing starting materials, 42 pork is known as regular pork trim, and it will include about 58% fat, about 8% protein and about 34% moisture. Pork of the 72 pork trim variety typically includes about 28% fat, about 15% protein and about 57% moisture. When the 72 pork originates from ham cuts, it is known as 72 ham. The low-fat or no-fat pork prepared according to the present invention will have on the order of about 1% fat, about 23% protein and about 76% moisture. Typically, the fat percent will be not greater than 1.5% fat, preferably about 1 weight percent or less of fat, the levels going to as low as about 0.3 weight percent fat.

Reduced fat pork of this type can be used, for example, to make fat-free pork products or be used as a component in making fat-free pork products incorporating whole muscle sources. Other uses include low-fat or no-fat sausage products and other products of the type discussed herein. When it comes to meat other than pork, fat removal tends to be a somewhat easier proposition. The low-fat or no-fat meat has the appearance of a relatively dry, finely ground pork. It has the appearance of finely chopped muscle, is very cohesive, and readily binds to itself.

The fat-free meat according to the invention can be used in fat-free ham or fat-free ham and water product, chopped and formed. In a specific example, the low-fat or no-fat finely textured reduced fat meat is incorporated into a meat block which also includes very lean meat muscle cuts and a brine composition. The brine composition is typically primarily water and will include at least about 1.5 wt % salt. In the case of hams, the brine composition has about 5% to about 8% salt. Flavoring and other components, such as preservatives and components useful for improving the firmness of the completed fat-free meat, are preferably also included in the water composition. A usual ham curing brine composition includes salt, sodium nitrite, sodium ascorbate or the like, sugar and other ingredients.

Addition of the phosphate salt prior to centrifugation substantially enhances the fat removal achieved during centrifugation. Generally speaking, this timely phosphate addition reduces the weight percent fat content by about 0.2 to about 0.3, at times as high as about 0.5, weight percentage points of fat-reduced content. As an example, for a reduced fat pork which, without phosphate addition, would have a fat content of about 1.5 weight percent, the phosphate addition according to the invention results in a fat content of about 1.2 weight percent or below. Thus, the fat content of the fat-reduced pork is reduced by from about 10% to about 40% by the addition of the phosphate source. Without this aspect of the invention, it is very difficult to maintain a fat level of below 1.5%, when the starting material is 72 pork.

Without being bound by any theory of a functional mechanism regarding this invention, it is believed that the phosphate addition as discussed herein reduces the viscosity of the meat, resulting in the enhanced separation of the fat component from the lean component which is accomplished when the thus-treated meat is subjected to centrifugation.

It is well known that, in the actomyosin of pork and the like, myosin and actin "slide" with respect to each other. Phosphate causes dissociation or loosening of this muscle structure so that actin protein and myosin can loosen and move around more easily in order to "release" fat components which would otherwise remain trapped in the meat structure during centrifugation carried out in the absence of this added phosphate. The phosphate is believed to provide a "softer" muscle which, when centrifuged, will "flatten out" so that the fat can separate more easily when the centrifuge takes advantage of the density differences between fat and lean.

By loosening the actin from the myosin, the fat-rich material "inside" of the muscle can be more easily removed. This loosening is facilitated by the phosphate use as described herein. In contrast, adipose tissue (fat tissue) is more easily removed because it generally sits on the "outside" of muscle bundles or strands. Thus, with pork, adipose tissue fat removal leaves about 2% to 3% fat, and the phosphate addition in accordance with the invention provides for removal of further fat, such as that associated with the actomyosin structure, thereby allowing the fat percentages of 1.5 weight percent and lower as discussed herein.

Phosphate sources according to the invention include a variety of phosphate salts and polyphosphates. As discussed herein, a polyphosphate may require time to dissociate so as to free individual diphosphate moieties which are found to achieve the beneficial effect in accordance with the invention. Thus, as a general rule, the more complex the phosphate source, the more likely same will have to be added at an upstream injection location, rather than at a more downstream injection location into the meat flow. Generally speaking, the phosphate source can be added at between about 0.1 to about 0.5 weight percent phosphate, based upon the meat being treated. A preferred range is between about 0.2% and about 0.5% phosphate. Generally speaking, higher levels do not further enhance fat removal and typically will be avoided. There is no desire to attempt to reach the isoelectric point of the meat, which is generally detrimental to functionality.

Examples of phosphate sources include sodium pyrophosphate (a diphosphate), potassium pyrophosphate, sodium tripolyphosphate and potassium tripolyphosphate. Also available and useful are blends of sodium or potassium acid pyrophosphate, tetrasodium pyrophosphate, tetrapotassium pyrophosphate, potassium hexametaphosphate, sodium hexametaphosphate or other such polyphosphates. They can be in particulate form, which is preferred, or in liquid form, such as when the phosphate is within an aqueous carrier.

The following examples are presented in order to illustrate the present invention.

EXAMPLE 1

Batches of 72 ham were processed through the apparatus as generally illustrated in FIG. 1 through FIG. 4. Sodium tripolyphosphate was added at an upstream location, being added to the ham trimmings prior to entry into the comminution unit.

In one test according to the invention, the sodium tripolyphosphate was added at a level of 0.5%, based upon the total weight of the meat. The resulting lean component exiting the centrifuge had an average fat content of 0.84 wt %. Individual sample fat content readings were as follows: 1.37%, 0.64%, 0.46%, 0.44%, 1.48%, and 0.67%, all being weight percents, based upon the total weight of the product having enhanced fat removal.

Additional runs were made under the same conditions and within the same equipment, except the level of sodium tripolyphosphate added was 0.05 weight percent, based upon the total weight of the meat. The average fat percent within the resulting lean meat product was 1.12 weight percent. The individual fat content readings for each one were as follows: 1.09%, 1.18%, 1.67%, 1.08%, 1.17%, and 0.53%.

Control batches were run on the same equipment and under the same conditions, again starting with the 72 ham trimmings. In this case, there was no phosphate addition. The average fat content of the resulting product was 1.14 weight percent, based upon the total weight of the product. The individual fat readings were as follows: 1.38%, 0.93%, 1.38%, 0.88%, 1.39% and 0.88%, all being weight percent based upon the weight of the lean meat product.

EXAMPLE 2

Testing generally in accordance with Example 1 was carried out. In one of set of runs, the 72 ham was ground to ⅛ inch, the feed temperature being 114° F. In one set of runs, 0.2% of sodium tripolyphosphate was added, resulting in an average fat content in the low-fat ham product from twelve individual samples of 1.34 wt %, based upon the weight of this product. The runs were substantially repeated, this time using 0.5 wt % of sodium tripolyphosphate. The fat content of the resulting lowfat ham averaged 1.45 weight percent.

EXAMPLE 3

Raw ham trimmings of 72 ham were passed through the equipment of FIG. 1 through FIG. 4 at a flow rate of 30 pounds per minute, the feed temperature being 114° F. The sodium tripolyphosphate was added at a level of 0.2 weight percent. The average weight percent fat for the products of these runs was 0.87%. Individual runs had the following fat percentages: 1.05%, 0.95%, 0.81%, 0.93%, 1.10%, 1.06%, 1.06%, 0.41%, 0.44%, 0.69%, 1.18%, 0.69%, 0.90%, and 0.98%, all being weight percent based upon the weight of the lean meat product.

Runs similar to the preceding were made, except the 72 ham was slightly more finely ground (5/64 inch), and the phosphate addition was omitted. The average fat content of products from several runs was 3.24 wt %, based upon the weight of the lean meat product.

EXAMPLE 4

72 ham ground at ⅛ inch was run through the apparatus illustrated in the drawings. Brifisol 414 (trademark), which is a commercial blend of sodium acid pyrophosphate, tetrasodium pyrophosphate and sodium hexametaphosphate, was added at a level of 0.2 weight percent, based upon the ham meat to which it was added. The average fat content of the resulting lean phase product was 1.49 weight percent.

A corresponding batch of 72 ham also ground at ⅛ inch was processed in the same manner, except the phosphate addition was omitted. The average fat content of the resulting reduced-fat product was 1.92 weight percent.

Similar 72 ham meat was ground at 5/64 inch and was run through the equipment as discussed, the temperature again being 114° F., and the flow rate being 30 pounds per minute.

No phosphate was added. The average fat content was 1.75 weight percent, based upon the weight of the lean meat product. Runs of this type were repeated, and the average fat content was 2.09 weight percent.

It will be understood that the embodiments of the present invention which have been described are illustrative of some of the applications of the principles of the present invention. Numerous modifications may be made by those skilled in the art without departing from the true spirit and scope of the invention.

We claim:

1. A very low fat meat product made by a process comprising the steps of:
   providing a supply of comminuted meat having a fat content of between about 5% and about 60% by weight, based upon the total weight of the meat;
   adding a phosphate source to said supply of meat, said phosphate source being added at a quantity of about 0.5% by weight or less phosphate, based upon the total of the meat;
   heating said supply of meat to a temperature adequate to generally melt fat within the supply of meat without significantly denaturing the meat;
   flowing said meat to provide a flow of heated comminuted meat having dispersed therewithin phosphate from said phosphate source;
   passing the flow of heated meat and phosphate from said flowing step into a centrifuge to subject said flow to a gravitational force sufficient to separate said flow into a lean meat phase and a high fat phase, said passing, step being after said adding step, said lean meat phase having a fat content of not greater than about 1.5% by weight of fat, based upon the total weight of the lean meat phase;
   collecting the lean meat phase as a flow of very low fat meat from the centrifuge;
   wherein said very low fat meat is undenatured and undiluted by added diluents other than from said phosphate source, has a fat content not greater than about 1.5 weight percent, based upon the total weight of said very low fat meat, and has a functionality of at least about 3.

2. The very low fat meat product in accordance with claim 1, wherein said very low fat meat has a functionality of at least about 4.

3. The very low fat meat product in accordance with claim 1, wherein said very low fat meat has a functionality of at least about 5.

4. The very low fat meat product in accordance with claim 1, wherein said fat content is not greater than about 1 weight percent, based upon the total weight of said very low fat meat.

5. The very low fat meat product in accordance with claim 1, wherein said supply of meat is pork and the fat content of the supply of comminuted meat is at least about 20% by weight.

6. The very low fat meat product in accordance with claim 1, wherein said very low fat meat has a particle size of between about 1–2 mm.

7. The very low fat meat product in accordance with claim 1, wherein said very low fat meat has a particle size of about 0.1–0.6 mm in length and about 0.06–0.1 mm in width.

* * * * *

UNITED STATES PATENT AND TRADEMARK OFFICE
CERTIFICATE OF CORRECTION

PATENT NO. : 6,099,891
DATED : August 8, 2000
INVENTOR(S) : Gundlach et al.

It is certified that error appears in the above-identified patent and that said Letters Patent is hereby corrected as shown below:

<u>Title page</u>,
ABSTRACT,
Line 1, delete "neat" and insert -- meat --.
Last line after "excellent functionality." insert -- The unformulated reduced fat meat is formable into a variety of familiar meat products, including wieners, sausages, hamburger patties, and the like, thereby providing products having taste, appearance, texture and other qualities which are substantially indistinguishable from products prepared from higher fat unformulated raw materials but which have very low fat content. The phosphate use accounts for a fat reduction of from about 10% to about 40%.

<u>Column 3</u>,
Line 46, "fatfree" should read -- fat-free --.

<u>Column 5</u>,
Line 30, delete "than" and insert -- that --.
Line 56, after "such" insert -- as --.

<u>Column 6</u>,
Line 34, "recirculation, channels" should read -- recirculation channels --.
Line 46, delete "temperature" and insert -- temperatures --.

<u>Column 11</u>,
Line 22, delete "generally".

Signed and Sealed this

Eighth Day of January, 2002

*Attest:*

*Attesting Officer*

JAMES E. ROGAN
*Director of the United States Patent and Trademark Office*